J. M. WAUGH.
RESILIENT WHEEL.
APPLICATION FILED MAR. 18, 1912.
1,192,139.
Patented July 25, 1916.
3 SHEETS—SHEET 1.
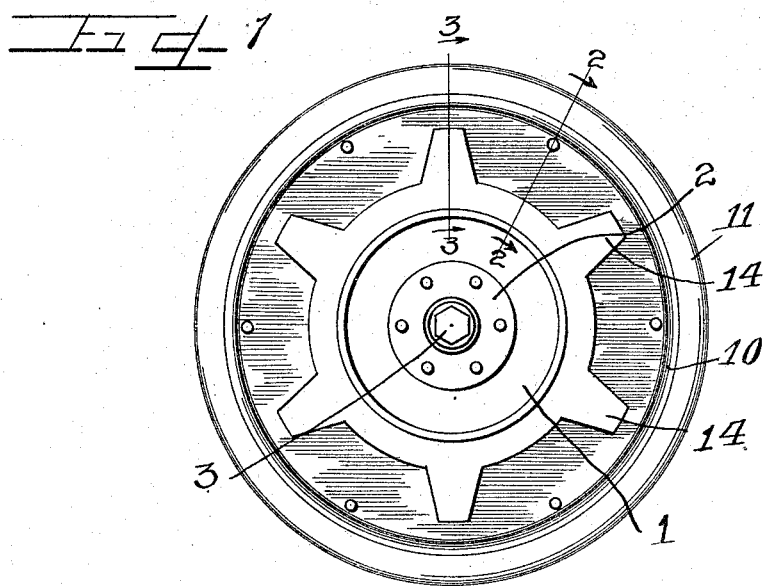
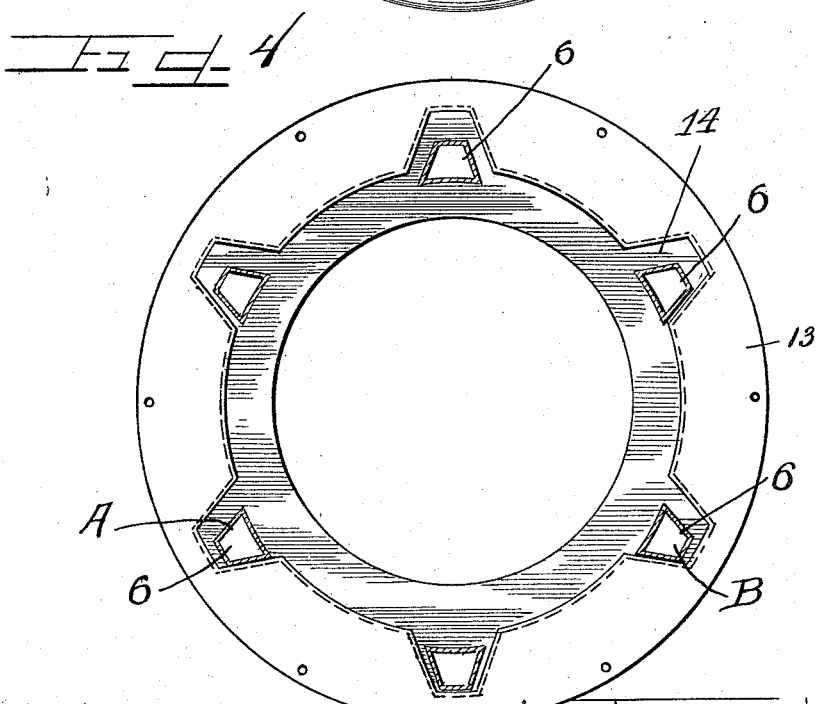

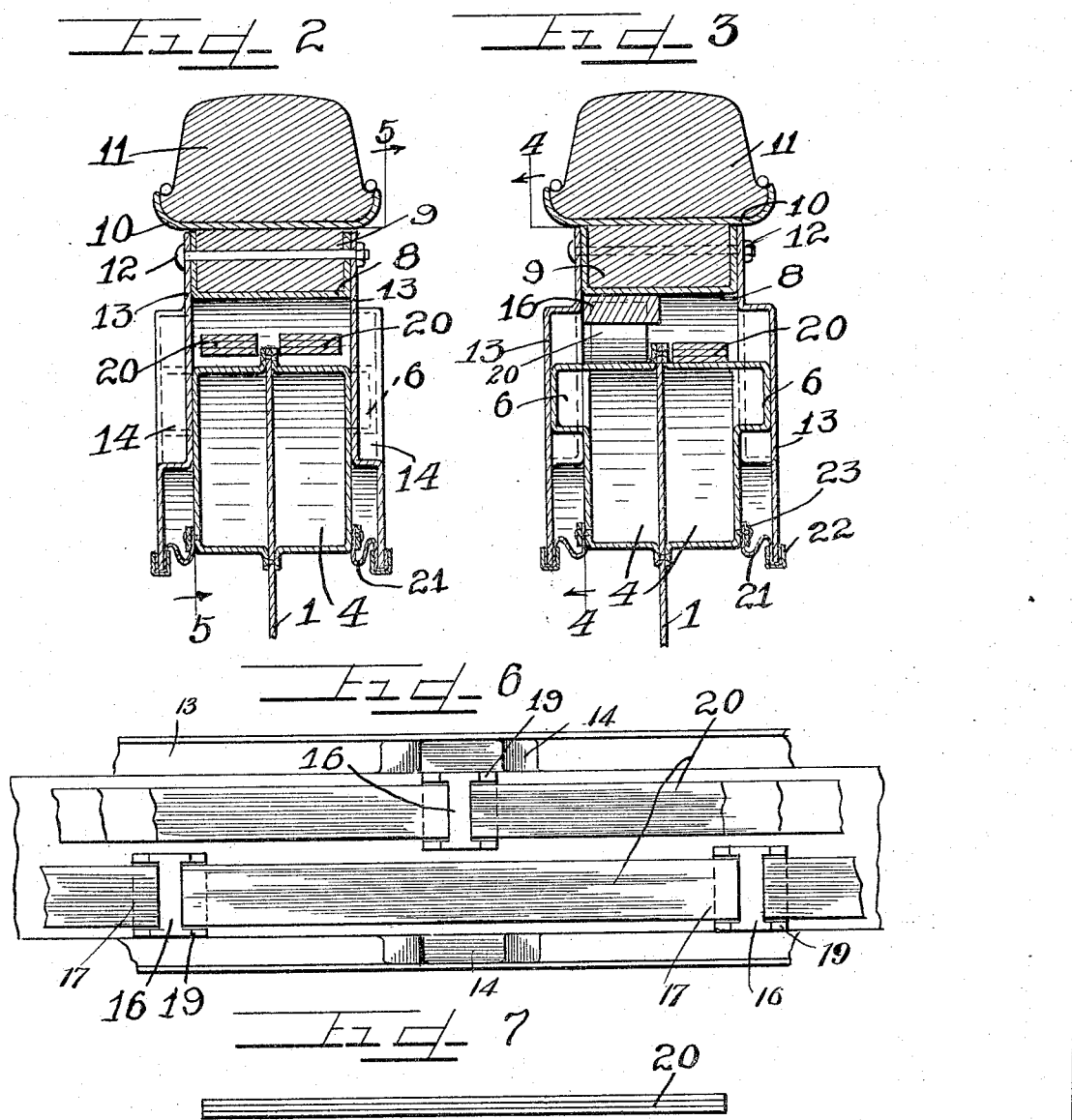

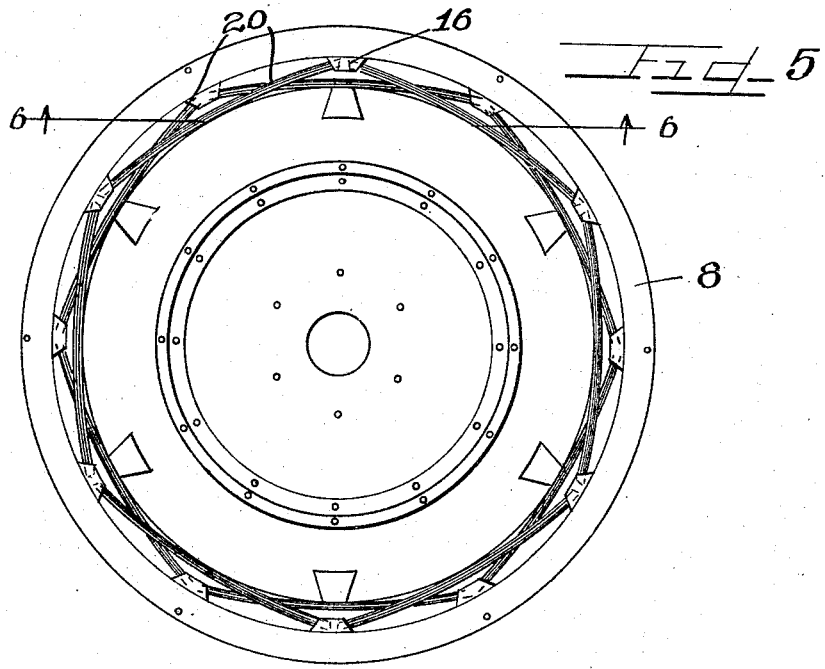

UNITED STATES PATENT OFFICE.

JAMES MILTON WAUGH, OF CHICAGO, ILLINOIS.

RESILIENT WHEEL.

1,192,139. Specification of Letters Patent. Patented July 25, 1916.

Application filed March 18, 1912. Serial No. 684,376.

*To all whom it may concern:*

Be it known that I, JAMES MILTON WAUGH, a citizen of the United States, and a resident of the city of Chicago, in the county of Cook and State of Illinois, have invented certain new and useful Improvements in Resilient Wheels; and I do hereby declare that the following is a full, clear, and exact description of the same, reference being had to the accompanying drawings, and to the numbers of reference marked thereon, which form a part of this specification.

Since the introduction of automobiles and the like into use, with which comparatively high velocity over ordinary or even rough roads is to be attained, the pneumatic tires used thereon have proven one of the most serious points of weakness, owing to the high first cost, and the almost constant expense incurred for repairs, renewals and replacements, and, notwithstanding such large expense occasioned thereby, frequent delay and great inconvenience is occasioned by the failure of the tire, through puncturing or otherwise, thereby preventing use of the vehicle until repairs or replacements are effected.

Many attempts have been made heretofore to afford a mechanical construction of the wheel itself, whereby sufficient resiliency may be attained to permit the pneumatic tire to be dispensed with, and to substitute in lieu thereof a solid or cushion (or other non-pneumatic) tire. Although numerous resilient wheels have heretofore been constructed in attempting to attain the objects, or some of the objects, hereinafter enumerated, most of the same have proven unsatisfactory, either for the reason that the resilient elements employed were ineffective for the purpose as installed in the construction, or for the reason that although resiliency was attained in the structure, the disposition of the resilient elements was such as to render the wheel as a whole structurally insufficient to properly sustain the load without undue deflection or to withstand the stresses to which the wheels are subjected upon curves.

The important object to be attained in such wheels is to absorb the shock due to passing over inequalities in the road and to prevent such shock to be communicated to the mechanism of the vehicle or the load. As wheels have heretofore been constructed, but little of the direct shock has been absorbed, and the recoil after such shock has frequently resulted in the breakage of springs or other inconvenience or injury.

The object of this invention is to afford a resilient wheel, which may be used either in connection with, or independently of a cushion tire, as preferred, and which is so constructed as to sustain the load which it is designed to carry, with exceedingly slight deflection from center.

It is also an object of the invention to afford exceedingly great strength, to resist lateral stresses to which the wheel may be subjected, and to so construct the wheel as to attain the full efficiency, and strength thereof in driving.

It is also an object of the invention to utilize in a construction such as described, resilient elements or springs, which yieldingly support the load and serve also as friction elements in absorbing shock therefrom, so that all shock to which the wheel is subjected, due to inequalities in the road, are absorbed both frictionally and by means of the resiliency of the springs, which serve as friction elements.

It is also an object of the invention to afford a construction whereby dirt and water are excluded from the resilient mechanism of the wheel and whereby a peripheral chamber is afforded in the wheel, in which may be contained lubricant, if desired.

The invention (in a preferred form) is illustrated in the drawings and hereinafter more fully described.

In the drawings: Figure 1 is a side or face elevation of a wheel embodying my invention. Fig. 2 is an enlarged fragmentary section on line 2—2 of Fig. 1. Fig. 3 is an enlarged, fragmentary section on line 3—3 of Fig. 1. Fig. 4 is a reduced section on line 4—4 of Fig. 3. Fig. 5 is a view similar to Fig. 1, with one of the side plates removed. Fig. 6 is a fragmentary inner plan view of the channeled rim and its parts. Fig. 7 is an enlarged edge view of a group of friction springs.

As shown in the drawings: 1, indicates an interior web, which may be constructed in any suitable manner to afford the desired strength to resist dishing or deformation due to lateral stresses. Secured centrally at said disk, are suitable hub collars 2, which contain the bearing for the axle 3, as is usual. It is to be understood that the shaft, hub, bearing, and disk or web affording the central web 1, of the wheel may be all of well known construction. Rigidly secured on each side of said web 1, at its periphery, and of a depth to extend some distance toward the hub are annular channel members 4, which may be constructed of pressed steel or other suitable material, and which form an inner rim of the desired width of tread for the inner portion of the wheel. Said channels, as shown in Figs. 2 and 3, are riveted in place upon the web 1, and each thereof is provided at equal distances around the periphery thereof with outwardly directed projections 6, which may be integral therewith, if desired. Extending peripherally around the central or inner wheel thus formed, is an outwardly facing channeled rim 8, having a felly 9, therein, and around which is suitably secured a tire rim 10, in which is engaged a cushion tire 11, of any suitable kind or type.

Secured on each side of the channel rim 8, by means of bolts 12, extending through the flanges thereof, and the felly 9, are annular plates 13, which extend inwardly on each side of the channels 4, before described, and are provided with outwardly tapering radial pockets 14, therein, to receive the projections 6, on the channels 4, before described. The depth of said pockets in said annular plates 13, is such as to afford a considerable amplitude of movement of the inner wheel relatively the outer rim 8. Secured in said outer rim 8, and projecting radially inward therefrom are inwardly tapered abutment heads or stops 16, each having a relatively broad base 17, which is riveted or otherwise secured in place on the rim. Said stops 16, taper inwardly and are provided with oppositely disposed recesses therein affording spring seats, the metal on each side of said recesses affording integral retaining flanges 19 for the spring plates hereinafter described. Said stops 16, as indicated in Figs. 5 and 6, are arranged alternately or in staggered relation on opposite sides of the rim 8, around the periphery thereof at equal distances apart. Seated therein at the ends thereof are groups of spring friction plates 20. Said groups of friction springs comprise flat, straight, steel plates of suitable width and length in bearing for their whole extent face to face, with the ends thereof engaged in the spring seats in the adjacent stops 16, on the same side of the rim 8. Said stops on opposite sides of the rim are arranged in staggered relation with reference to those on the other side. Said groups of friction springs are in bearing with the periphery of the channels 4, on the web 1, bearing centrally on all the groups. The number of plates in each of said groups will vary in wheels of different sizes and for different purposes, and may also vary with the thickness of the individual leaves or plates affording said friction springs, and depending upon the amount of resiliency desired to be attained. The length of each group of springs is such that when arranged as before described, all the groups of springs are tensioned slightly by their mutual pressure on the periphery of the channels 4, as shown in Fig. 5. As shown also, a flexible strip or band 21, of rawhide or other suitable material, is engaged at the inner periphery of the annular plate 13, by means of a channel 22, as shown in Figs. 2 and 3, the inner edge thereof having previously been engaged by means of an annular clamping plate 23, on the channels 4, thus sealing the space between the annular plate 13, and said channels and preventing moisture and dirt finding ingress and also serving to retain therein any lubricant for the springs and stops, for example, graphite, which may be inserted therein.

The operation is as follows: The spring plates affording the friction spring groups, are relatively broad and thin. In the construction shown, six of such groups are provided on each side of the wheel, said spring plates being arranged staggered on opposite sides of the wheel, so that the superposed weight of the inner wheel and its load is at all times supported on approximately five of said groups, or at least upon a plurality of such groups. Said springs being slightly tensioned when inserted, act to hold the inner wheel against lateral stresses, and the annular plates 13, which closely engage the sides of the inner wheel at the rim thereof, act to receive all lateral stresses, affording great strength to withstand the same. The drive of the inner wheel is communicated to the outer rim or tread portion of the wheel by means of the projection 6, which engage the walls of the pockets 14, as shown in Figs. 2, 3, and 4, so that at least one of said projections on each side the wheel is always in driving engagement, and, owing to the arrangement and tapered form of said tapered projections and pockets, one of said projections—for example, A, on the descending side of the wheel is in driving position while the corresponding projection B, on the opposite or rising side of the wheel, is in position to immediately engage to reverse, should it be desirable, thus obviating altogether any tendency to lost motion in going from drive to reverse position.

Any shock delivered to the tire or tread of the wheel is communicated to, and absorbed by the springs to the limit of their capacity, said springs acting to absorb such shock, not only because of their resiliency, but act, as well, frictionally, owing to the exceedingly large frictional bearing or contact surface of the plates or leaves in each spring, and, inasmuch as a large number of such spring groups are at all times utilized in supporting the load, the individual spring groups may be made relatively light as compared to the load to be carried and the shocks to be absorbed, while the shock absorbing capacity of all the groups affected, will be considerably enhanced. Obviously, objectionable recoil is practically eliminated by the frictional action of the springs and by the balanced construction or arrangement of springs about the periphery of the wheel. In consequence, breakage of the springs does not occur and an exceedingly easy riding construction is afforded.

I have shown but a preferred form of my invention, and it is to be understood, of course, that numerous details of the arrangement and construction of parts may be varied and what I have termed the inner wheel may be constructed in any suitable manner; that the outer or tread portion may or may not be equipped with a cushion tire; and that any desired number of groups of spring friction plates may be employed, depending upon the width of rim. I therefore do not purpose limiting myself otherwise than necessitated by the prior art.

I claim as my invention:

1. In a resilient wheel, the combination with an inner wheel rim, an outer rim surrounding the same and resilient means therebetween, of annular plates secured to said outer rim and inclosing said inner rim, said plates being provided with outwardly tapering radial pockets, and lateral projections on said inner rim for engaging said pockets to cause the rims to rotate together.

2. In a resilient wheel, the combination with an inner wheel rim, an outer rim surrounding the same, stops disposed on the inner periphery of said outer rim, and groups of spring friction plates of equal length arranged between said rims with their ends bearing against said stops and at their middle contacting with the inner rim, of annular plates secured to said outer rim and inclosing said inner rim, said plates being provided with outwardly tapering radial pockets, and lateral projections on said inner rim for engaging said pockets to cause the rims to rotate together.

In testimony whereof I have hereunto subscribed my name in the presence of two subscribing witnesses.

JAMES MILTON WAUGH.

Witnesses:
LAWRENCE REIBSTEIN,
CHARLES W. HILLS, Jr.

Copies of this patent may be obtained for five cents each, by addressing the "Commissioner of Patents, Washington, D. C."